United States Patent
Endo et al.

(10) Patent No.: US 7,349,027 B2
(45) Date of Patent: Mar. 25, 2008

(54) SCAN CONVERTER (75) Inventors: Junpei Endo, Hirakata (JP); Satoshi Furukawa, Hirakata (JP); Kenichi Hagio, Toyonaka (JP)

(73) Assignee: Matsushita Electric Works, Ltd., Osaka (JP)

( * ) Notice: Subject to any disclaimer, the term of this patent is extended or adjusted under 35 U.S.C. 154(b) by 547 days.

(21) Appl. No.: 11/094,157

(22) Filed: Mar. 31, 2005

(65) Prior Publication Data
US 2005/0264691 A1 Dec. 1, 2005

(30) Foreign Application Priority Data
May 31, 2004 (JP) .............................. 2004-162352

(51) Int. Cl.
H04N 7/01 (2006.01)
H04N 11/20 (2006.01)
H04N 5/04 (2006.01)
H04N 9/64 (2006.01)
G06F 13/372 (2006.01)
G06F 12/00 (2006.01)
G09G 5/36 (2006.01)

(52) U.S. Cl. ...................... 348/446; 348/550; 348/715; 348/718; 345/534; 345/545; 345/558; 345/564

(58) Field of Classification Search ................ 348/446, 348/550, 714–716, 718; 345/558, 536, 531, 345/534, 545, 564
See application file for complete search history.

(56) References Cited

U.S. PATENT DOCUMENTS

| | | | |
|---|---|---|---|
| 5,767,903 A | 6/1998 | Kawamura et al. | |
| 5,949,950 A * | 9/1999 | Kubo | 386/46 |
| 6,226,038 B1 * | 5/2001 | Frink et al. | 348/443 |
| 6,337,716 B1 * | 1/2002 | Yim | 348/554 |
| 6,356,306 B1 | 3/2002 | Kobayashi | |
| 6,538,700 B1 * | 3/2003 | Ohta et al. | 348/513 |
| 6,567,130 B1 * | 5/2003 | Schulz | 348/714 |
| 6,570,579 B1 * | 5/2003 | MacInnis et al. | 345/629 |
| 6,636,269 B1 * | 10/2003 | Baldwin | 348/500 |
| 6,798,420 B1 * | 9/2004 | Xie | 345/554 |
| 6,922,195 B2 * | 7/2005 | Satoh et al. | 345/531 |

(Continued)

FOREIGN PATENT DOCUMENTS

JP 3363761 B2 10/2004

OTHER PUBLICATIONS

European Search Report dated Sep. 27, 2006.

*Primary Examiner*—Brian P. Yenke
(74) *Attorney, Agent, or Firm*—Cheng Law Group PLLC (57) ABSTRACT

The scan converter comprises first and second memories 3, 7, a frame memory 5; having a write period and a read period, a video data input circuit 2 for writing data at a first transfer rate into the memory 3, a video data output circuit 8 for outputting the data from the memory 7 at a third transfer rate. The transfer rate between the memories 3, 7 and the memory 5 is twice as fast as the first or third transfer rate, whichever is faster, and the memories 3 has data storage capacities greater than an amount of the data to be written into the memory 5 in each write period, and the memories 7 has data storage capacities greater than an amount of the data to be read from the memory 5 in each read period.

8 Claims, 7 Drawing Sheets

U.S. PATENT DOCUMENTS

| | | |
|---|---|---|
| 6,950,144 B2 * | 9/2005 | Chae .......................... 348/513 |
| 7,136,110 B2 * | 11/2006 | Honma et al. .............. 348/571 |
| 7,142,252 B2 * | 11/2006 | Song .......................... 348/565 |
| 2002/0109698 A1 * | 8/2002 | Champion et al. .......... 345/545 |
| 2002/0109791 A1 * | 8/2002 | Champion .................. 348/714 |
| 2002/0109792 A1 * | 8/2002 | Champion .................. 348/714 |
| 2002/0113904 A1 * | 8/2002 | Champion .................. 348/714 |
| 2003/0184678 A1 * | 10/2003 | Chen et al. ................. 348/511 |
| 2005/0024369 A1 * | 2/2005 | Xie ............................. 345/547 |
| 2005/0104890 A1 * | 5/2005 | Champion .................. 345/531 |

* cited by examiner

SCAN CONVERTER

TECHNICAL FIELD

The present invention relates to a scan converter, more particularly, to a scan converter for converting progressive scan video data into interlaced scan video data.

BACKGROUND ART

Japanese Patent Publication No. 3363761 discloses a scan converter for converting progressive scan video data into interlaced scan video data. The scan converter comprises a frame memory and line memories, and one line of progressive scan video data sent from an image pickup means is written into the line memory at normal transfer rate in a certain period. In the next period, the video data written into the line memory is read out therefrom and written into the frame memory at twice the normal transfer rate in the first half of the period, while another line of the progressive scanning video data is written into the above line memory at the normal transfer rate, and, in the latter half of the period, the video data stored in the frame memory is read out therefrom at twice the normal transfer rate. Thus, the scan converter can convert the progressive scanning video data into the interlaced scanning video data using a single port type frame memory, so it can reduce the cost.

However, because it is necessary for the scan converter to equalize the period in which one line of the video data is written into the frame memory and the period in which one line of the video data is read out from the frame memory, it is necessary for the scan converter to synchronize the progressive scan video data and the interlaced scan video data. For example, when a signal extracted from the progressive scan video data is used as the horizontal synchronization signal, the interlaced scan video data has to synchronize with the progressive scan video data. Conversely, when a signal extracted from the interlaced scan video data is used as the horizontal synchronization signal, the image pickup means has to have a function which synchronize the video data by an external signal.

Furthermore, because this scan converter synchronizes the progressive scan video data and the interlaced scan video data on a line-by-line basis, the progressive scan video data and the interlaced scan video data also synchronize with each other on a frame-by-frame basis. Therefore, only an image pickup means having the same frame rate as the interlaced scan video data can be used, and the image pickup means having a different frame rate can not be used.

Still furthermore, because the scan converter needs to use line memories, the cost may increase.

DISCLOSURE OF THE INVENTION

In view of the above problem, the object of the present invention is to provide a scan converter which can stably convert progressive scan video data into interlaced scan video data using a single port type frame memory even if the progressive scan video data and the interlaced scan video data are not synchronized with each other A scan converter of the present invention comprises a first FIFO memory, a second FIFO memory, a frame memory having a write period and a read period, a video data input means configured to take video data given from an image pickup means in a progressive scan mode and to write the video data at a first transfer rate into the first FIFO memory, a write/read timing control means configured to set the frame memory alternately in the write period and the read period, a data writing means configured to transfer the video data from the first FIFO memory to the frame memory at a second transfer rate within the write period, a data reading means configured to transfer the video data from the frame memory to the second FIFO memory in an interlaced scan mode at the second transfer rate within the read period, a video data output means configured to output the video data from the second FIFO memory at a third transfer rate.

The second transfer rate is set to be at least twice as fast as the first transfer rate or the third transfer rate, whichever is faster, and the first FIFO memory has a data storage capacity greater than an amount of the video data to be written into the frame memory in each write period, and the second FIFO memory has a data storage capacity greater than an amount of the video data to be read out from the frame memory in each the read period.

The scan converter configured as mentioned above can stably convert the progressive scan video data into the interlaced scan video data using a single port type frame memory even if the progressive scan video data and the interlaced scan video data are not synchronized with each other.

Preferably, the write/read timing control means switches between the write period and the read period in a period shorter than a period of a horizontal synchronizing signal of a standard television signal. In this case, the scan converter can reduce the data storage capacity of the first and second FIFO memories.

Preferably, the scan converter further includes a memory address control means configured to control an address of the frame memory in which the data writing means writes the video data and from which the data reading means reads out the video data. In this case, the frame memory has a data storage capacity of three or more frames, and the frame memory is divided into two or more address areas each of which has a data storage capacity of one frame. And, the memory address control means allocates one of the address areas to a write address area in which the data writing means writes the video data, and switches the write address area in rotation. And, the memory address control means allocates one of the address area which is different from the write address area, to a read address area from which the data reading means reads out the video data. In this case, the scan converter can output the video data more stably.

Preferably, the memory address control means switches the write address area in synchronization with a vertical synchronizing signal of the video data sent from the image pickup means, and the memory address control means switches the read address area in synchronization with a vertical synchronizing signal of the standard television signal. The memory address control means may switch the read address area in synchronization with each field of the interlaced scan video data.

Preferably, the memory address control means allocates one of the address area which was allocated to the write address area immediately preceding the current write address area to the read address area.

Preferably, the frame memory is DRAM, and the frame memory is refreshed in a blanking period of the video data read out from the frame memory.

Preferably, the second transfer rate is set to be at least three times as fast as the first transfer rate or the third transfer rate, whichever is faster, and the data reading means reads out a first video data which is not greater than one line and is to be outputted as the video data, from the scan converter and a second video data which is not greater than one line and is adjacent to the first video data in a vertical direction, and the scan converter further includes an arithmetic processing means which performs a computation, such as resizing, filtering, and zooming of an image, using the first and the second video data.

BEST MODE FOR CARRYING OUT THE INVENTION

Hereinafter, the present invention will be described in more detail with reference to the accompanying drawings.

First Embodiment

Figure 1:
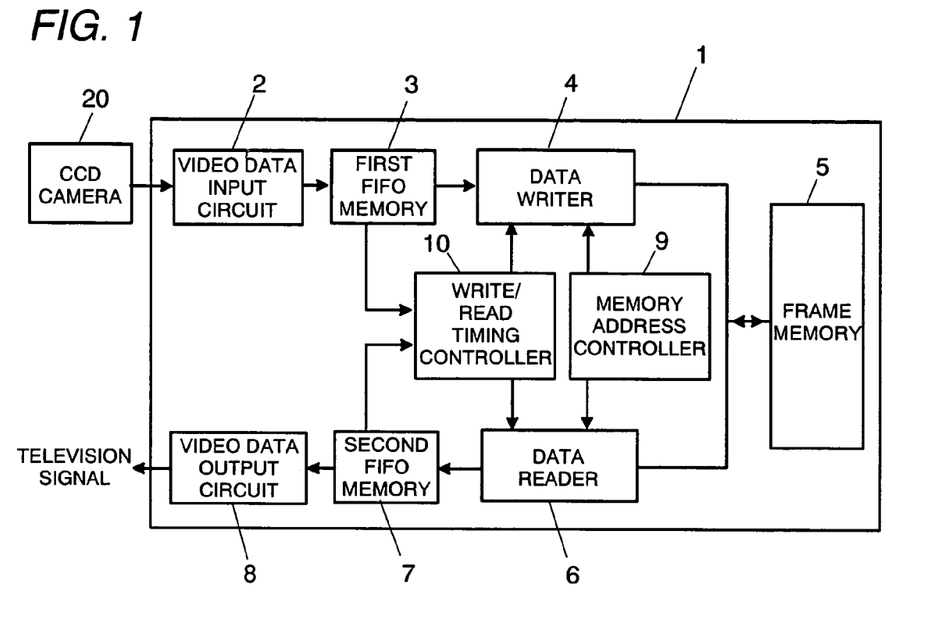
FIG. 1 is a block diagram showing a scan converter in accordance with a first embodiment of the present invention.

FIG. 1 is a block diagram of a scan converter in accordance with a first embodiment of the present invention. The scan converter 1 takes a progressive scan video data from a CCD camera 20 and outputs an interlaced scan video data based on the standard television signal (NTSC, PAL, or SECAM). The CCD camera 20 outputs video data in progressive scan mode at a first transfer rate which is determined by a clock signal supplied to the CCD camera 20 or a signal obtained by dividing the clock signal. In this embodiment, the first transfer rate is faster than a transfer rate (a third transfer rate) which is based on the standard television signal.

The scan converter 1 comprises a video data input circuit 2, a first FIFO memory 3, a data writer 4, a frame memory 5, a data reader 6, a second FIFO memory 7, a video data output circuit 8, a memory address controller 9, and a write/read timing controller 10.

The video data input circuit 2 takes the video data from the CCD camera 20 and writes the video data into the first FIFO memory 3 at the first transfer rate.

The first FIFO memory 3 has a data storage capacity of 24 words (in other words, the first FIFO memory 3 can hold 24 pixels of the video data), and when it stores 8 or more words of the video data, it outputs a write request signal to the write/read timing controller 10.

The second FIFO memory 7 also has a data storage capacity of 24 words. When it has available space of 8 or more words, it outputs a read request signal to the write/read timing controller 10.

The data writer 4 transfers the video data from the first FIFO memory 3 to the frame memory 5, as described later in detail.

The data reader 6 transfers the video data from the frame memory 5 to the second FIFO memory 7, as described later in detail.

Figure 2:
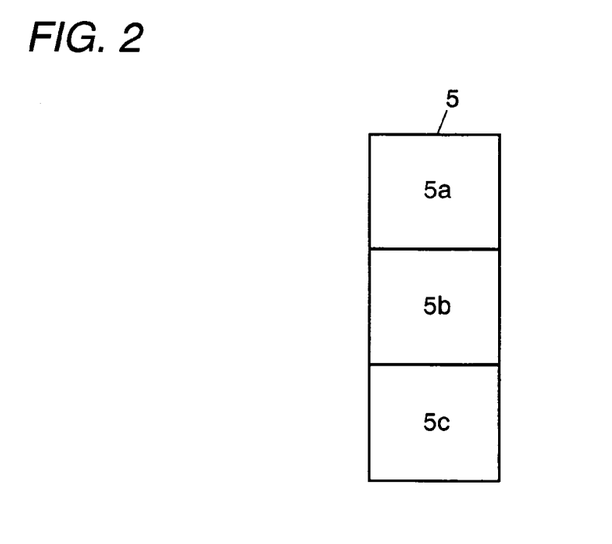
FIG. 2 is a view showing address areas of a frame memory in the scan converter.

The frame memory 5 is SDRAM (synchronous Dynamic Random Access Memory), which has a single input/output port. The frame memory 5 has a data storage capacity of 3 frames. The frame memory 5 has a write period in which the frame memory is writable and a read period in which the frame memory is readable. Data transmission between the first or second FIFO memory and the frame memory 5 is accomplished in 8 words burst mode. As shown in FIG. 2, the frame memory 5 is divided into three address areas 5a, 5b, and 5c, each of which has a data storage capacity of one frame.

Figure 3:
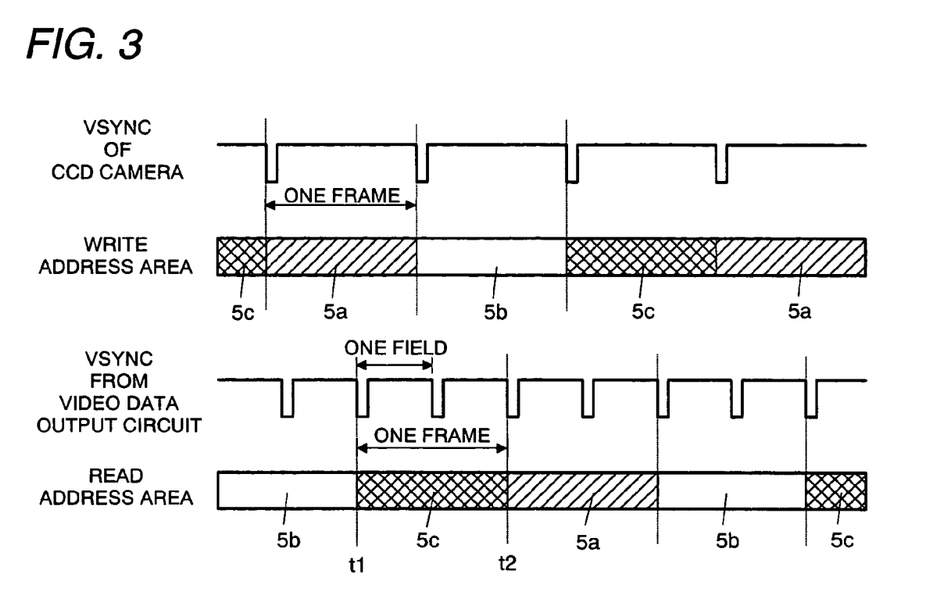
FIGS. 3 and 4 are timing charts showing timing for switching between the address areas in the scan converter.
Figure 4:
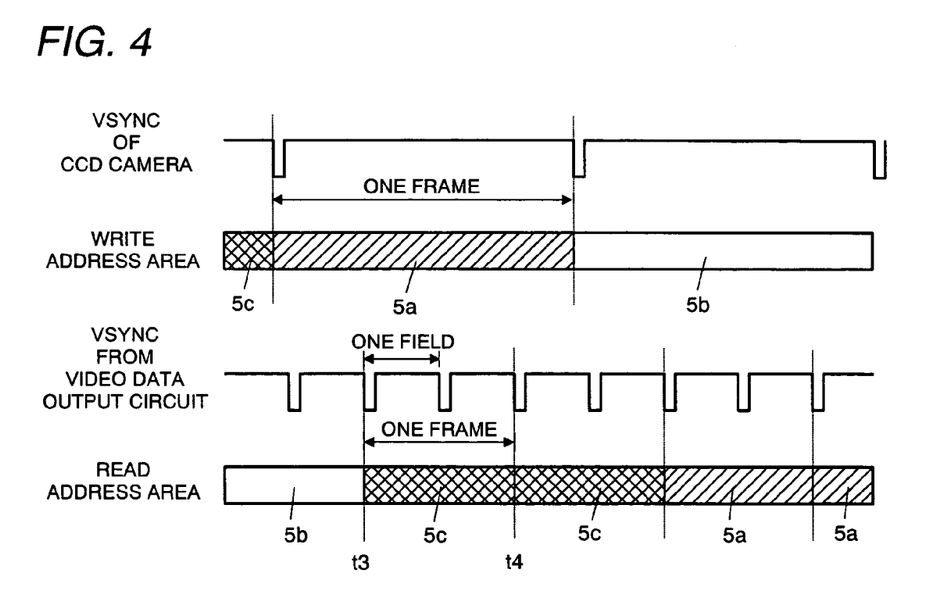

The memory address controller 9 controls an address of the frame memory 5 in which the data writer 4 writes the video data and an address of the frame memory 5 from which the data reader 6 reads out the video data. More specifically, the memory address controller 9 allocates one of the address areas 5a, 5b, and 5c to a write address area in which the data writer 4 writes the video data, and it allocates one of the address areas which is different from the write address area to a read address area from which the data reader 6 reads out the video data. As shown in FIG. 3, the memory address controller 9 switches the write address area in the order of 5a-5b-5c in synchronization with one frame of the vertical synchronizing signal (VSYNC) of the video data sent from the CCD camera 20. And, the memory address controller 9 switches the read address area in synchronization with one frame of the vertical synchronizing signal of the standard television signal generated by the video data output circuit 8 (as is well known, one frame of the standard television signal is composed of two fields; even-field and odd field.). The memory address controller 9 allocates one of the address area which was allocated to the write address area immediately preceding the current write address area to the read address area. For example, at time t1 in FIG. 3, the memory address controller 9 allocates the address areas 5c, which was allocated to the write address area immediately preceding the current write address area 5a, to the read address area. Similarly, at time t2, the memory address controller 9 allocates the address areas 5a, which was allocated to the write address area immediately preceding the current write address area 5b, to the read address area. FIG. 4 shows a case where the interval of the one frame of the video data sent from the CCD camera 20 becomes longer than the interval of the one frame of the standard television signal because of a function, such as a slow shutter, of the CCD camera 20. In this case, at time t3, the memory address controller 9 allocates the address areas 5c to the read address area, and, at time t4, too, the memory address controller 9 allocates the address areas 5c to the read address area, because, at time t4, in comparison with the time t3, the address area which was allocated to the write address area immediately preceding the current write address area (5a) dose not change.

The write/read timing controller 10 alternately generates a write enable signal which sets the frame memory 5 in the write period and a read enable signal which sets the frame memory 5 in the read period.

Figure 5:
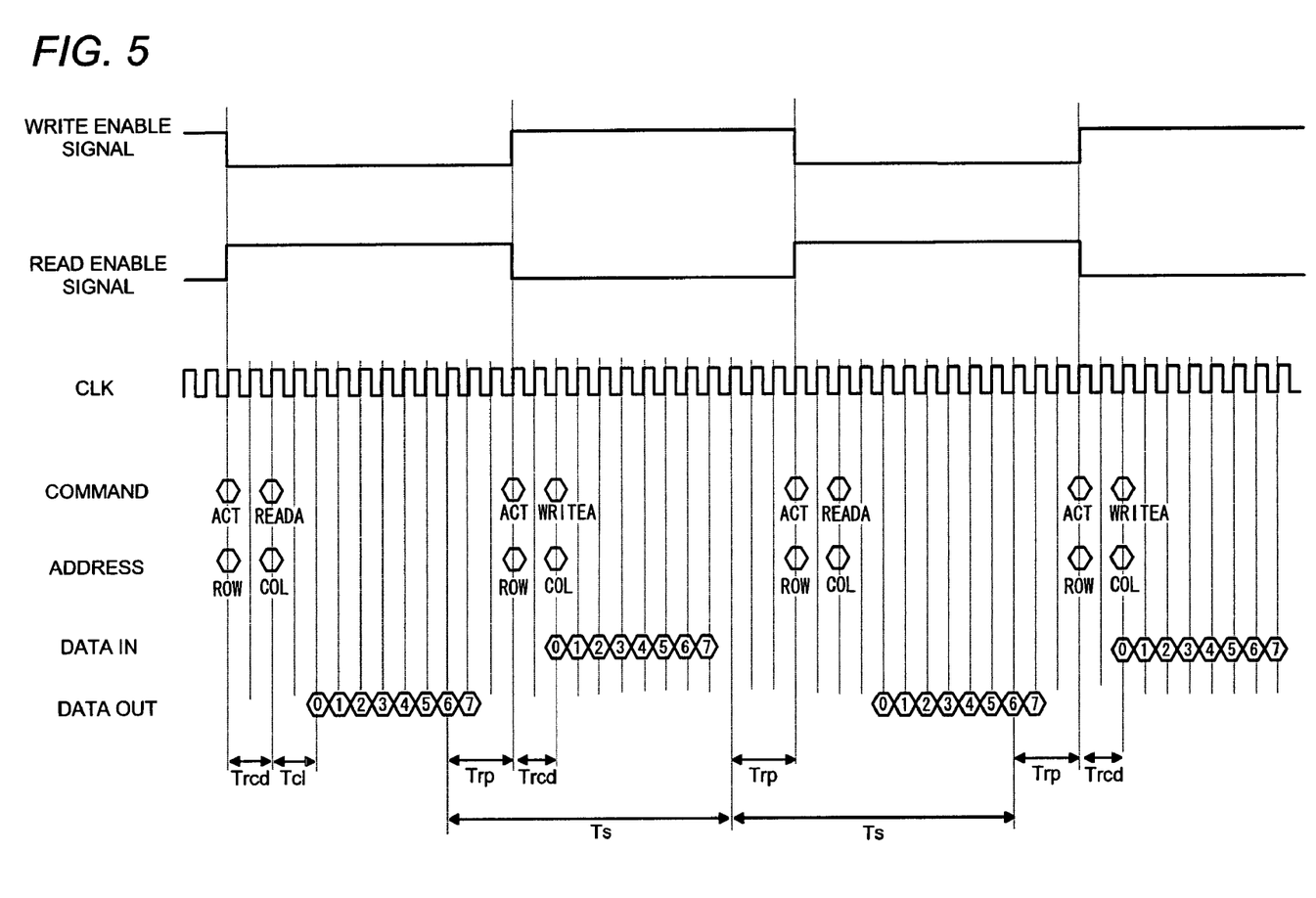
FIG. 5 is a timing chart showing timing for switching between a write enable signal and a read enable signal in the scan converter.

The write enable signal is held high during a period needed for transmitting 8 words from the first FIFO memory 3 to the frame memory 5. More specifically, as shown in FIG. 5, the write enable signal is held high while an "ACT" command and a row address ("ROW") are inputted into the frame memory 5 to activate the frame memory 5 and then a "WRITEA" command and a column address ("COL") are inputted into the frame memory 5 and then 8 words video data are written into the frame memory 5 and a pre-charge of the frame memory 5 is performed ("Trp"). The "ACT" command is a command which switches the frame memory 5 from a standby state to an active state, and the "WRITEA" command is a command to write data in an address specified by the row address and the column address. In FIG. 5, a "Trcd" shows a time period which is needed for performing the "WRITEA" command after performing the "ACT" command. The pre-charge is performed automatically at regular time intervals ("Ts").

The read enable signal is held high during a period needed for transmitting 8 words from the frame memory 5 to the second FIFO memory 7. More specifically, as shown in FIG. 5, the read enable signal is held high while the "ACT" command and a row address ("ROW") is inputted into the frame memory 5 and then a "READA" command and a column address ("COL") is inputted into the frame memory 5 and then 8 words video data are read out from the frame memory 5 and the pre-charge is performed. The "READA" command is a command to read out data from specified address. In FIG. 5, "Tcl" shows a time period which is needed for reading out data from specified address after performing the "READA" command.

The write enable signal and the read enable signal are switched in a period shorter than the period of the horizontal synchronizing signal (HSYNC) of the standard television signal.

Figure 6:
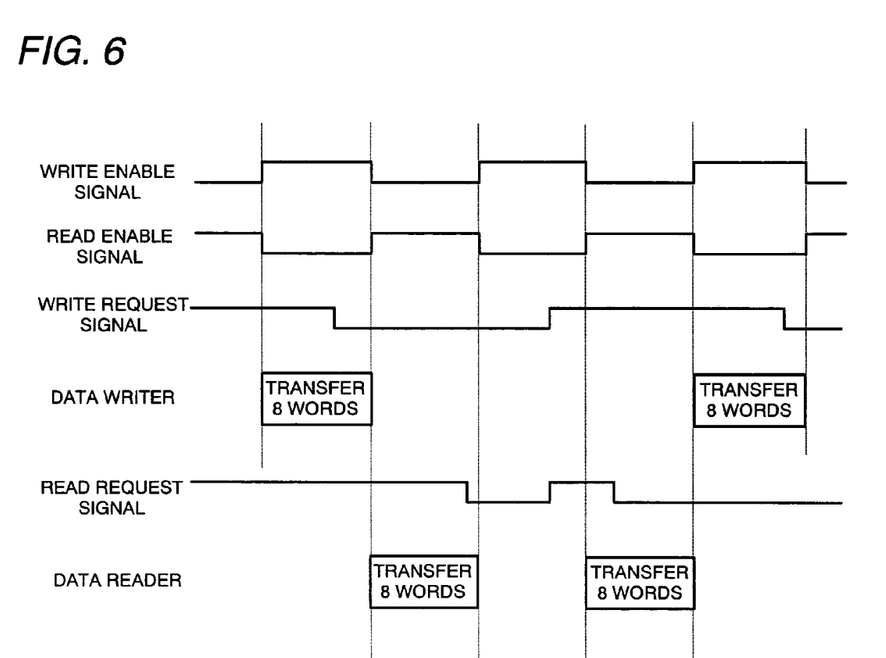
FIG. 6 is a timing chart showing timing for transmitting data between the first and second FIFO memories and the frame memory in the scan converter.

The data writer 4 receives the write enable signal from the write/read timing controller 10 and receives the write request signal from the first FIFO memory 3. And, as shown in FIG. 6, while the write request signal is high, the data writer 4 transfers 8 words in burst mode from the first FIFO memory 3 to the frame memory 5 in response to the rising edge of the write enable signal. That is, the video data is written into the frame memory 5 when the first FIFO memory 3 stores 8 or more words of the video data and the frame memory 5 has been set in the writable period. The transfer rate (a second transfer rate) from the first FIFO memory 3 to the frame memory 5 is set twice as fast as the first transfer rate.

The data reader 6 receives the read enable signal from the write/read timing controller 10 and receives the read request signal from the second FIFO memory 7. And, as shown in FIG. 6, while the read request signal is high, the data reader 6 transfers 8 words in burst mode from the frame memory 5 to the second FIFO memory 7 in response to the rising edge of the read enable signal. At that time, the data reader 6 reads out the video data from the frame memory 5 in interlaced scan mode. That is, the video data is read out from the frame memory 5 when the second FIFO memory 7 has available space of 8 or more words and the frame memory 5 has been set in the readable period. The transfer rate from the frame memory 5 to the second FIFO memory 7 is also set twice as fast as the first transfer rate; that is, the second transfer rate.

As is clear from FIG. 6, the switching timing between the write enable signal and the read enable signal is not synchronized with the write request signal and the read request signal (In other words, the switching timing between the write enable signal and the read enable signal is not synchronized with the timing that the video input means 2 writes the video data into the first FIFO memory 3 and the timing that the video data output circuit 8 reads out the video data from the second FIFO memory 7.).

The video data output circuit 8 reads out the video data from the second FIFO memory 7 based on the timing and the clock (the third transfer rate) of the standard television signal and generates a television signal to output the interlaced scan video data.

Now, the scan converter 1 configured as mentioned above can stably convert the progressive scan video data into the interlaced scan video data using a single port type frame memory 5 even if the progressive scan video data and the interlaced scan video data do not synchronized each other. The reason will be described below.

The amount of the video data D1 which the video data input circuit 2 writes into the first FIFO memory 3 during one pair of the write period and the read period is:

$$D1=2*T*r1$$

where T is a time period of each write period and each read period, and r1 is the first transfer rate.

The amount of the video data D2 which the data writer 4 can transmit from the first FIFO memory 3 to the frame memory 5 during the same period (that is, during one pair of the write period and the read period) is:

$$D2=T*r2$$

where r2 is the second transfer rate, because the video data can be transmitted from the first FIFO memory 3 to the frame memory 5 only when the frame memory 5 is in the write period (T).

Therefore, the amount of the video data D3 which remains in the first FIFO memory 3 during the period is:

$$D3=D1-D2=2*T*r1-T*r2$$

So, if the second transfer rate r2 is at least twice as fast as the first transfer rate r1 (r2>=2*r1), then $$D3<=0$$

This means that the video data written into the first FIFO memory 3 during one pair of the write period and the read period can be all transmitted to the frame memory 5 during the pair of the write period and the read period if the second transfer rate r2 is at least twice as fast as the first transfer rate r1. That is, the video data does not keep increasing in the first FIFO memory 3 if the second transfer rate r2 is at least twice as fast as the first transfer rate r1.

It is necessary for the first FIFO memory 3 to have a data storage capacity greater than the amount of the video data D1 which the video data input circuit 2 writes into the first FIFO memory 3 during one pair of the write period and the read period. That is, because the amount of the video data D1 is:D1=2*T*r1<=T*r2 when the second transfer rate r2 is at least twice as fast as the first transfer rate r1 (r2>=2*r1), it is necessary for the first FIFO memory 3 to have a data storage capacity greater than "T*r2"; namely, the amount of the video data to be written into the frame memory 5 in each write period.

As stated above, if the second transfer rate r2 is at least twice as fast as the first transfer rate r1 (r2=>2*r1) and the first FIFO memory 3 has a data storage capacity greater than the amount of the video data to be written into the frame memory 5 in each write period, all video data sent from the CCD camera 20 can be stored in the frame memory 5, without an overflow.

Similarly, the amount of the video data D4 which the data reader 6 can transmit to the second FIFO memory 7 during one pair of the write period and the read period is:

$$D4=T*r2$$

where T is the time period of each read period and r2 is the second transfer rate, as mentioned above.

The amount of the video data D5 that the video data output circuit 8 outputs from the second FIFO memory 7 during the same period is:

$$D5=2*T*r3$$

where r3 is the third transfer rate, that is, the transfer rate of the standard television signal.

Therefore, the amount of the video data D6 which remains in the second FIFO memory 7 during the period is:

$$D6=D4-D5=T*r2-2*T*r3$$

So, if the second transfer rate r2 is at least twice as fast as the third transfer rate r3 (r2>=2*r3), then $$D6>=0$$

This means that the video data written into the second FIFO memory 7 during one pair of the write period and the read period can not be less than zero in the second FIFO memory 7. That is, the video data is outputted continuously from the second FIFO memory 7, without interruption.

And, it is necessary for the second FIFO memory 7 to have a data storage capacity greater than "D4" (=T*r2), that is, the amount of the video data to be read out from the frame memory in each the read period.

For the reasons stated above, the scan converter 1 can stably convert the progressive scan video data into the interlaced scan video data, without an overflow of the video data sent from the CCD camera 20 and an interruption of the video data to be outputted from the scan converter 1, if the second transfer rate r2 is at least twice as fast as the first transfer rate r1 (r2>=2*r1), which meets the condition r2=>2*r3 because r1>r3 in this embodiment, and the first FIFO memory 3 has a data storage capacity greater than the amount of the video data to be written into the frame memory 5 in each write period, and the second FIFO memory 7 has a data storage capacity greater than the amount of the video data to be read out from the frame memory in each the read period.

In addition, although the first transfer rate is faster than the third transfer rate in this embodiment, the third transfer rate may be faster than the first transfer rate. In this case, it is necessary that the second transfer rate r2 is at least twice as fast as the third transfer rate r3. That is, it is necessary that the second transfer rate is at least twice as fast as the first transfer rate or the third transfer rate, whichever is faster.

In addition, because it is necessary for the first FIFO memory 3 to have a data storage capacity greater than the amount of the video data to be written into the frame memory 5 in each write period (that is, "T*r2"), as mentioned above, the time period T of each write period is preferred to be short in order to reduce the data storage capacity of the first FIFO memory. Similarly, in order to reduce the data storage capacity of the second FIFO memory 7, the time period T of each read period is preferred to be short. So, in this embodiment, the write/read timing controller 10 switches between the write enable signal and the read enable signal in a period shorter than the period of the horizontal synchronizing signal (HSYNC) of the standard television signal to reduce the data storage capacity of the first and second FIFO memories.

In addition, because the frame memory 7 has the data storage capacity of three frames and the write address area and the read address area are different from each other in this embodiment, the scan converter can more stably convert the progressive scan video data into the interlaced scan video data.

Furthermore, because the memory address controller 9 allocates one of the address area, which was allocated to the write address area immediately preceding the current write address area, to the read address area, the scan converter 1 can output the video data without interruption even if a frame rate of the video data from the CCD camera 20 becomes slow because of a function, such as a slow shutter, of the CCD camera 20.

Figure 7:
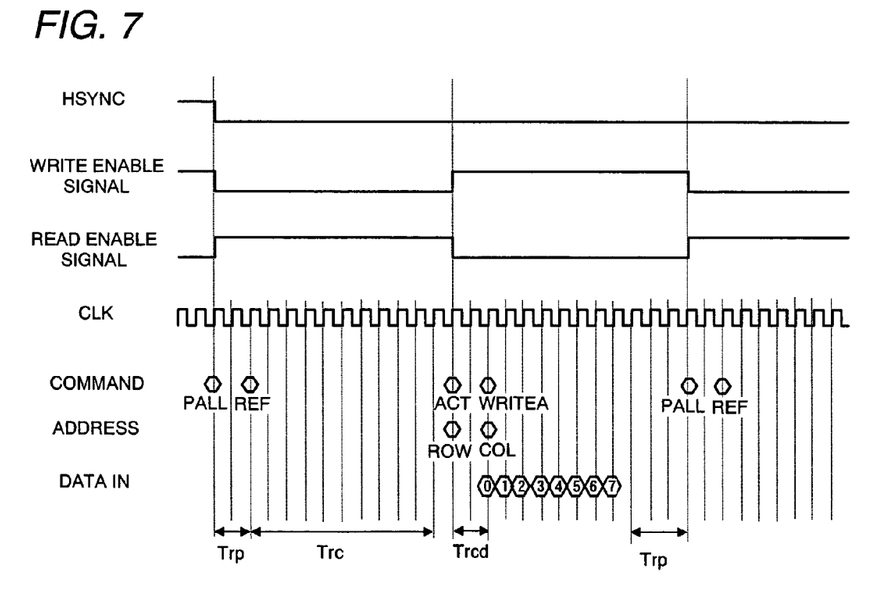
FIG. 7 is a timing chart showing refreshing timing of the frame memory in the scan converter.

By the way, because the frame memory 5 is SDRAM, the frame memory 5 requires refreshing. It is preferable that the frame memory 5 is refreshed in a blanking period of the video data read out from the frame memory 5. In this embodiment, as shown in FIG. 7, the frame memory 5 is refreshed by using "PALL" command and "REF" command in response to the rising edge of the read enable signal while the horizontal synchronizing signal (HSYNC) of the standard television signal generated by the video data output circuit 8 is LOW, that is, in the blanking period of the video data. The "PALL" command is a command which performs pre-charge of the frame memory 5 and the "REF" command is a command which performs auto-refreshing. In FIG. 7, a "Trc" shows a time period which is needed for performing a command after performing the "REF" command. Therefore, even if the video data is outputted from the scan converter 1 at a slow frame rate because of a function such as a slow shutter, it is prevented that the frame memory 5 loses the data by volatilization.

Figure 8:
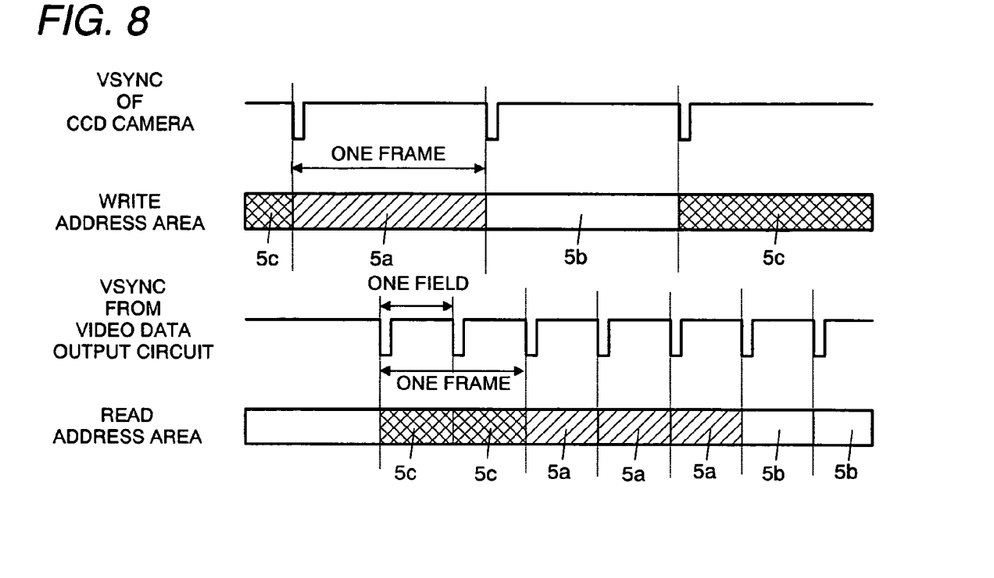
FIG. 8 is a timing chart showing another timing for switching between the address areas in the scan converter.

Although, in this embodiment, the memory address controller 9 switches the read address area in synchronization with one frame of the vertical synchronizing signal of the standard television signal generated by the video data output circuit 8, the memory address controller 9 may switch the read address area in synchronization with one field of the vertical synchronizing signal of the standard television signal, as shown in FIG. 8. In other words, the read address area may be switched in synchronization with each field of the interlaced scan video data. In this case, too, the memory address controller 9 allocates the address areas which was allocated to the write address area immediately preceding the current write address area, to the read address area. When the memory address controller 9 switches the read address area in synchronization with each field of the interlaced scan video data, the scan converter 1 can output fast-moving video data smoothly.

Second Embodiment

Figure 9:
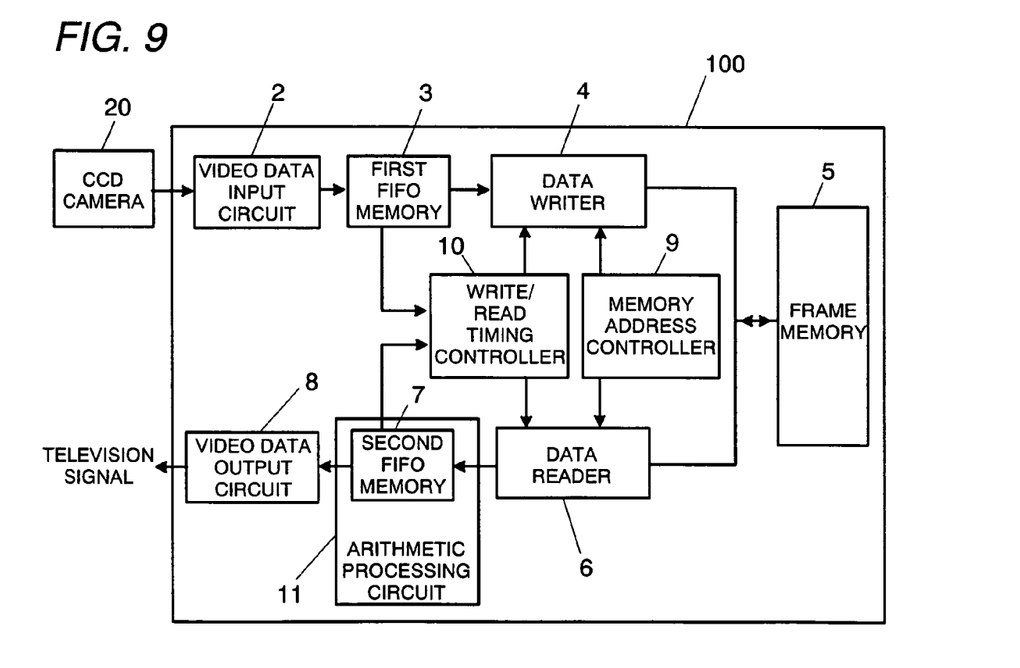
FIG. 9 is a block diagram showing a scan converter in accordance with a second embodiment of the present invention.

FIG. 9 shows a scan converter 100 in accordance with a second embodiment of the present invention. The basic composition of this embodiment is identical to the first embodiment, so the similar part of these embodiments are identified by the same reference character and no duplicate explanation is made here. In this embodiment, too, the first transfer rate is faster than the third transfer rate.

This scan converter 100 includes an arithmetic processing circuit 11 which performs computations, such as resizing, filtering, and zooming of an image, in addition to the composition of the first embodiment.

The second FIFO memory 7 in this embodiment has a data storage capacity of 24 words, and when it has available space of 16 or more words, it outputs a read request signal 5 to the write/read timing controller 10.

Figure 10:
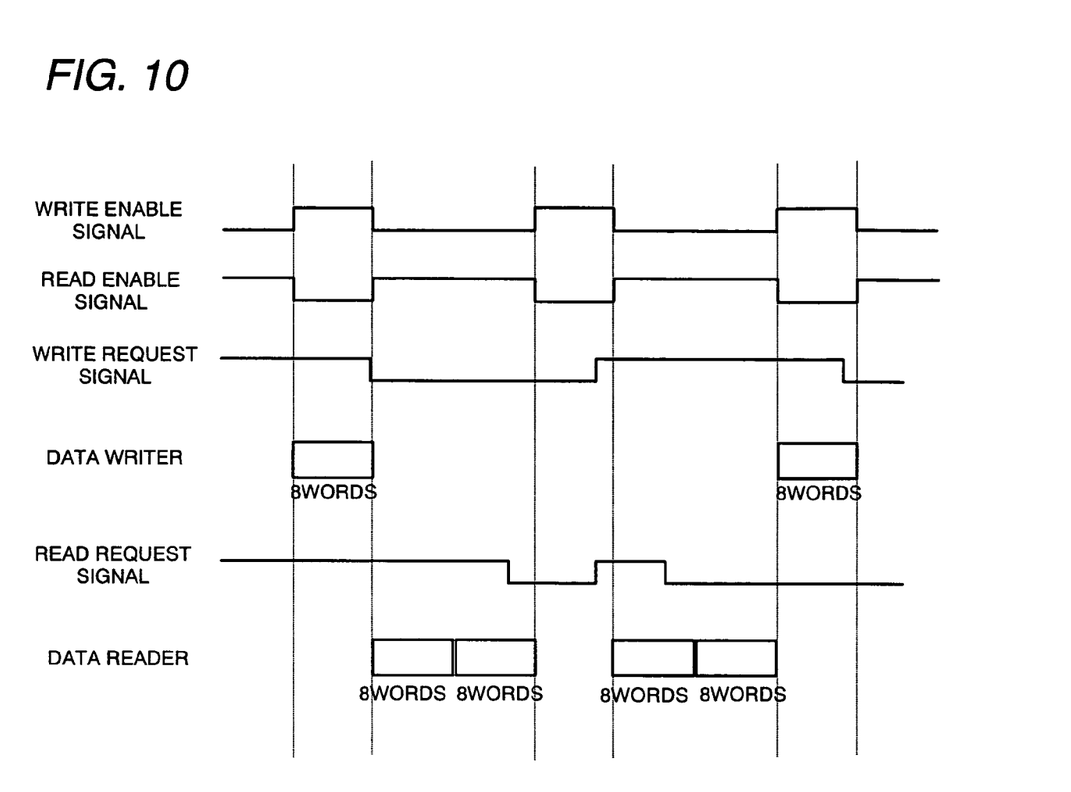
FIG. 10 is a timing chart showing timing for transmitting data between the first and second FIFO memories and the frame memory in the scan converter of the FIG. 9.
Figure 11:
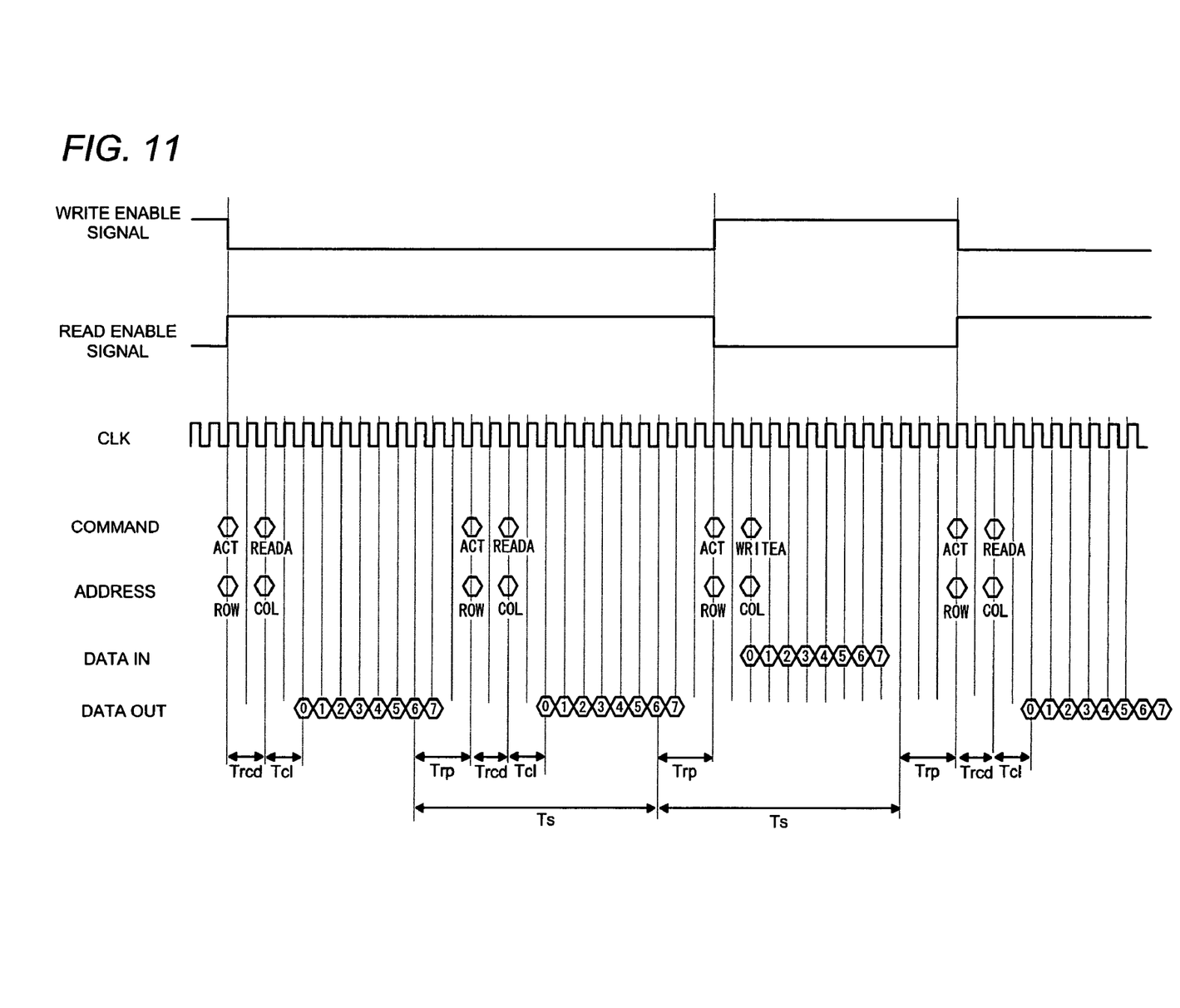
FIG. 11 is a timing chart showing timing for switching between a write enable signal and a read enable signal in the scan converter of the FIG. 9.

As shown in FIG. 10, the write enable signal is held high during a period needed for transmitting 8 words from the first FIFO memory 3 to the frame memory 5, and the read enable signal is held high during a period needed for transmitting 8 words twice from the frame memory 5 to the second FIFO memory 7. That is, as shown in FIG. 11, the read enable signal is held high while the predetermined sequence for transmitting 8 words; inputting "ACT" command and a "READA" command and transmitting 8 words video data and performing the pre-charge, is performed twice.

The data writer 4 transfers 8 words in burst mode from the first FIFO memory 3 to the frame memory 5 in response to the rising edge of the write enable signal while the write request signal is high. The transfer rate (the second transfer rate) from the first FIFO memory 3 to the frame memory 5 is set three times as fast as the first transfer rate.

The data reader 6 transfers 8 words twice in burst mode from the frame memory 5 to the second FIFO memory 7 in response to the rising edge of the read enable signal while the read request signal is high. At that time, the data reader 6 reads out 8 words (pixels) video data, which are consecutive 8 pixels in horizontal direction and not greater than one line, as the first video data from the frame memory 5, and furthermore, it reads out 8 words (pixels) video data which are adjacent to the first video data in a vertical direction as the second video data from the frame memory 5. The transfer rate from the frame memory 5 to the second FIFO memory 7 is also set three times as fast as the first transfer rate.

The switching timing between the write enable signal and the read enable signal is not synchronized with the write request signal and the read request signal.

The first video data stored in the second FIFO memory 7 is outputted from the video data output circuit 8 to the exterior at the third transfer rate based on the standard television signal. Furthermore, using the first and second video data stored in the second FIFO memory 7, the arithmetic processing circuit 11 performs various computations, such as horizontal/vertical compression of the video data, and then, the arithmetic processing circuit 11 outputs the result of the computations to the video data output circuit 8. By including the arithmetic processing circuit 11, the scan converter 100 of this embodiment can performs resizing, filtering, zooming of an image and so on, easily, without extra line memory.

In this embodiment, because the second transfer rate is set three times as fast as the first transfer rate, the scan converter 100 can stably convert the progressive scan video data into the interlaced scan video data, without an overflow of the video data sent from the CCD camera 20 and an interruption of the video data to be outputted from the scan converter 100.

The invention claimed is:

1. A scan converter for converting progressive scan video data into interlaced scan video data comprising:
   a first FIFO memory;
   a second FIFO memory;
   a frame memory having a write period and a read period;
   a video data input means configured to take video data given from an image pickup means in a progressive scan mode and to write the video data at a first transfer rate into said first FIFO memory;
   a write/read timing control means configured to set said frame memory alternately in the write period and the read period;
   a data writing means configured to transfer the video data from said first FIFO memory to said frame memory at a second transfer rate within said write period;
   a data reading means configured to transfer the video data from said frame memory to said second FIFO memory in an interlaced scan mode at the second transfer rate within the read period,
   a video data output means configured to output the video data from said second FIFO memory at a third transfer rate;
   wherein the second transfer rate is set to be at least twice as fast as the first transfer rate or the third transfer rate, whichever is faster,
   said first FIFO memory having a data storage capacity greater than an amount of said video data to be written into said frame memory in each write period;
   said second FIFO memory having a data storage capacity greater than an amount of said video data to be read out from said frame memory in each said read period.

2. The scan converter as set forth in claim 1, wherein the write/read timing control means switches between the write period and the read period in a period shorter than a period of a horizontal synchronizing signal of a standard television signal.

3. The scan converter as set forth in claim 1, further including
   a memory address control means configured to control an address of said frame memory in which said data writing means writes the video data and from which said data reading means reads out the video data;
   said frame memory having a data storage capacity of three or more frames, said frame memory being divided into two or more address areas each of which has a data storage capacity of one frame,
   said memory address control means allocating one of the address areas to a write address area in which said data writing means writes the video data and switching the write address area in rotation,
   said memory address control means allocating one of the address area which is different from the write address area to a read address area from which said data reading means reads out the video data.

4. The scan converter as set forth in claim 3, wherein
said memory address control means switches the write address area in synchronization with a vertical synchronizing signal of the video data sent from the image pickup means,
said memory address control means switching the read address area in synchronization with a vertical synchronizing signal of the standard television signal.

5. The scan converter as set forth in claim 3, wherein
said memory address control means allocates one of the address area which was allocated to the write address area immediately preceding the current write address area to the read address area.

6. The scan converter as set forth in claim 3, wherein
said memory address control means switches the read address area in synchronization with each field of the interlaced scan video data.

7. The scan converter as set forth in claim 1, wherein said frame memory is DRAM, said frame memory being refreshed in a blanking period of the video data read out from the frame memory.

8. The scan converter as set forth in claim 1, wherein the second transfer rate is set to be at least three times as fast as the first transfer rate or the third transfer rate, whichever is faster, said data reading means being configured to read out a first video data which is not greater than one line and is to be outputted as the video data from the scan converter and a second video data which is not greater than one line and is adjacent to the first video data in a vertical direction, said scan converter further including an arithmetic processing means which performs a computation using the first and the second video data.

* * * * *